Jan. 19, 1960  E. A. GLYNN  2,921,338
TIRE MOUNTING DRUM AND FLANGE UNIT
Original Filed April 15, 1952
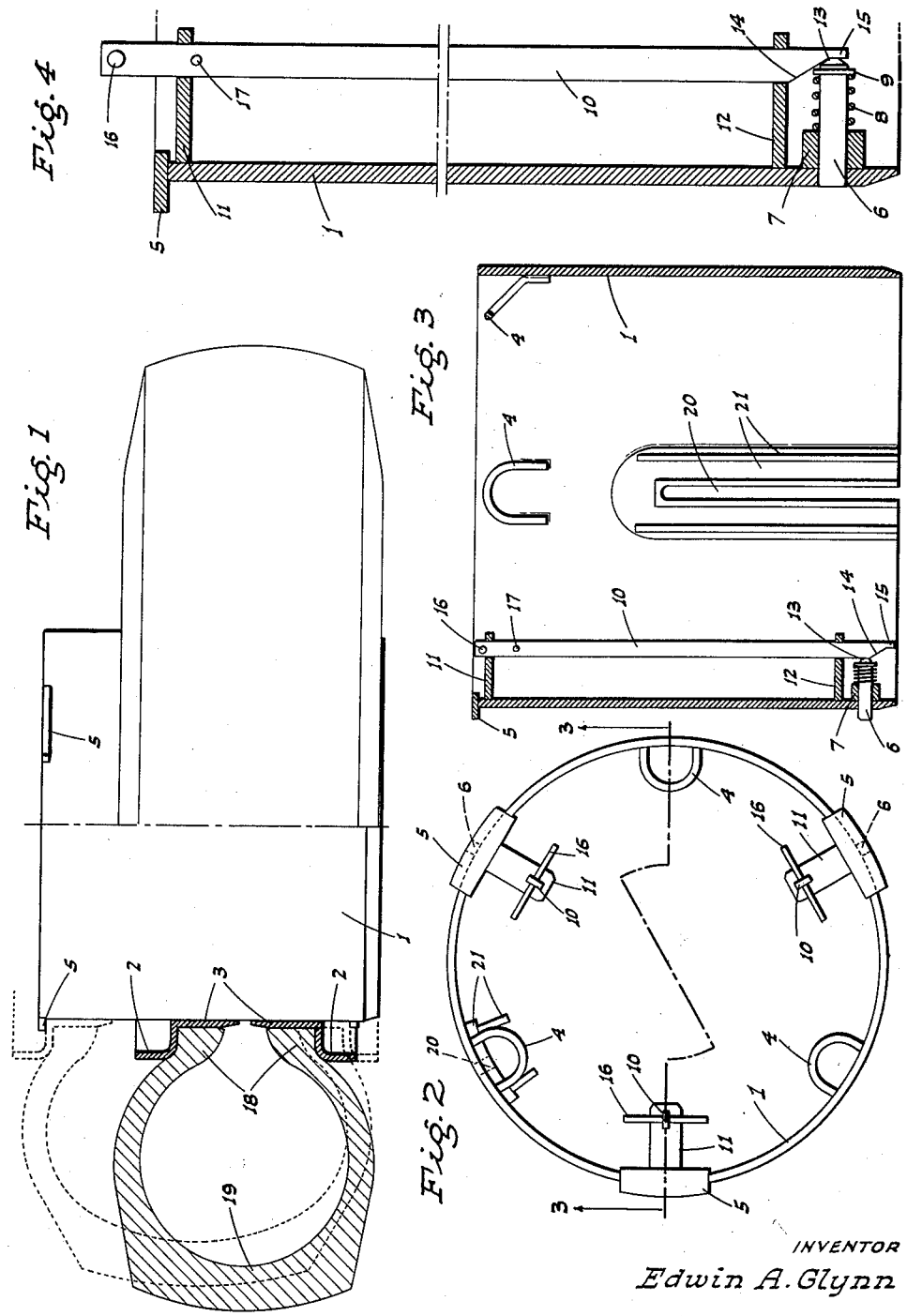
INVENTOR
Edwin A. Glynn
ATTORNEYS United States Patent Office 2,921,338
Patented Jan. 19, 1960

2,921,338

TIRE MOUNTING DRUM AND FLANGE UNIT

Edwin Allen Glynn, Lodi, Calif., assignor to Super Mold Corporation of California, Lodi, Calif., a corporation of California Continuation of application Serial No. 282,419, April 15, 1952. This application March 7, 1955, Serial No. 492,666

8 Claims. (Cl. 18—18)

This invention relates to a tire mounting device for use in connection with a retread vulcanizing mold, and is a continuation of my application, Serial No. 282,419, filed April 15, 1952, now abandoned.

A major object of the invention is to provide a tire mounting drum and flange unit particularly designed for use with large heavy tires, and which unit enables the tire to be readily lowered into, and removed from, a horizontal mold.

An additional object of the invention is to provide a tire mounting drum and flange unit especially adapted for use in connection with the method of placing a tire in and removing same from a mold, as described in United States Patent No. 2,639,466, dated May 26, 1953.

Another object of the invention is to provide a tire mounting drum and flange unit, for the purpose described, which includes a pair of separate tire-bead engaging flanges, and a central drum initially free from the flanges, on which the latter may be readily mounted after engagement with the tire beads, and which drum may then be raised and lowered with the tire as a unit.

A further object of the invention is to provide a tire mounting drum and flange unit, as above, which permits the flanges a predetermined amount of movement relative to each other and to the drum, while being normally prevented from removal therefrom, so as to allow of the inflation of the tire while mounted on the drum, with resultant separation of the beads and reduction in the diameter of the tire as may be necessary for it to be inserted into the mold.

Still another object of the invention is to provide retractible bead-flange stops on the drum adjacent its lower end, and means manually operable from the upper end of the drum to permit retraction or cause advance of the stops, as may be desired.

This is an important and valuable feature, since with the large and very heavy tires for which this device is particularly intended, it is practically impossible to manipulate the tires by hand, and such a tire is laid flat on the floor when the drum and flange unit is being mounted on or removed from the tire.

In connection with the control of the retractible bead stops from the upper end of the drum when either the tire or the lower end of the drum is thus resting on the floor, a further important object of the present invention is to arrange the bead stops, and the means for retracting and advancing the same, so that no interference with such stops, or their operation, is had by reason of such floor engagement. In other words, the stops and their actuating means always remain in a position above floor level—or the lower edge of the drum—regardless of the position of the stops relative to the retractible bead flange.

An additional object of the invention is to provide a tire mounting drum and flange unit, for use with a retread vulcanizing mold, which is designed for ease and economy of manufacture.

It is also an object of the invention to provide a practical and reliable tire mounting drum and flange unit for use with a retread vulcanizing mold, and one which will be exceedingly effective for the purpose for which it is designed.

These objects are accomplished by means of such structure and relative arrangement of parts as will fully appear by a perusal of the following specification and claims.

In the drawings:

Fig. 1 is an elevation of the unit as supporting a tire, with the bead-flanges and tire partly in section.

Fig. 2 is a plan view of the drum, detached.

Fig. 3 is a sectional elevation on line 3—3 of Fig. 2, showing one of the retractible stops as advanced.

Fig. 4 is an enlarged fragmentary sectional elevation showing a retractible stop as retracted.

Referring now more particularly to the drawings, and to the characters of reference marked thereon, the tire mounting drum and flange unit comprises essentially an open-ended drum 1 and a pair of tire-bead engaging flanges 2 which include base bands 3 projecting toward each other, as shown in Fig. 1, and freely slidable along the drum.

Inside the drum and adjacent the top, the drum is provided with a plurality of evenly spaced, substantially semi-circular rigid yokes 4 projecting inward from the wall of the drum at an upward angle, as shown in Fig. 3, for engagement with the lifting hooks of a hoist-cable arrangement.

Centrally between the different yokes, segmental abutment elements 5 are fixed with the drum at the top, overhang the outer wall of the drum, and form stop means to limit upward movement of the adjacent flange 2.

Additional but retractible stop means are provided adjacent the lower end of the drum directly below the elements 5, to limit downward movement of the adjacent flange 2, and to normally prevent removal of both flanges from the drum. Such retractible stop means comprise radially disposed pins 6. As shown in Figs. 2 and 3, each pin is slidable in a boss 7 projecting into the drum. The pin is pulled radially inward by a compression spring 8 mounted on the pin between the inner end of the boss and a washer or shoulder 9 fixed on the pin adjacent its inner end.

The pin retracting action of the spring is limited, and each pin advanced to a stop forming position, by means of a vertical bar 10 slidable in upper and lower guide members 11 and 12, respectively, which project inwardly from the drum and maintain the bar in crossing relation to the inner end of the pin; said inner end being formed with a taper nose 13.

Adjacent its lower end, the face of the bar is cut on a downward and inward taper, as at 14, to engage the nose 13; the bar terminating in a straight tip 15 below the taper 14. Said taper and tip are arranged so that when the bar is pulled up by a crosshandle 16 on the upper end of the bar and until the tip 15 engages the nose of the pin, said pin will be retracted by the spring 8 until the outer end of the pin is substantially flush with the outer surface of the drum, as shown in Fig. 4. At the same time, a cross pin 17 on the bar below the upper guide 11 forms a stop abutting against the under side of said guide, as shown in Fig. 4; preventing further upward movement of the bar and the disengagement of the tip 15 from the pin which would follow such further movement.

When each bar is pushed down, the taper 14 rides against the taper nose 13 of the pin and pushes the pin radially out against the resistance of the spring until the flat of the bar engages the nose 13, as shown in Fig. 3.

At this time, the cross handle 16 abuts the upper face of the guide 11, limiting the lowering movement of the bar.

It will thus be seen that in-and-out movement of each stop pin is easily controlled, and with either ultimate position of the bar and pin, the spring 8 cannot act to move the pin, since the nose of the latter is then bearing against a surface which is at right angles to the axis of the pin.

In mounting a tire on the above unit, the flanges 2 are first removed from the drum (by retracting pins 6) and are mounted on the beads 18 of the tire 19 to be handled.

The drum—with the pins 6 still retracted—is then lowered into the bands 3 of the flanges 2, while the tire is resting on the floor, and until the drum also rests on the floor. The pins 6 are then advanced one by one below the adjacent flange 2, as shown in Fig. 1. The tire may then be hoisted by lifting the drum by a cable suspended from above, and the tire placed—with the drum—into a retread vulcanizing mold.

As will be evident from the above description, nothing prevents ready manipulation of the stop pins when the drum is thus resting on the floor, since said pins—being always above the lower edge of the floor-supported drum—do not contact the floor or other surface on which the drum may be resting.

It may be noted that before the tire is mounted on the drum, an inflatable tube, including a valve stem as usual (not shown), is inserted in the tire. The tube stem projects into a longitudinal slot 20 in the drum open to the lower end thereof; the drum being suitably reinforced along the slot interiorly of the drum, as at 21.

When the tire is inflated, the beads can separate of themselves, together with the flanges 2, to the extent determined by the stops 5 and 6, so that the diameter of the inflated tire is decreased, as shown in dotted lines, and thus enabling the tire to be inserted into the mold without interference, and similarly withdrawn therefrom after the vulcanizing operation has bene performed. During such operation, when the mold is closed, the side walls of the tire are confined to an extent such that the tread is forcefully expanded into the matrix of the mold.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A tire mounting device comprising a cylindrical drum adapted to be disposed with its axis in a vertical position, a pair of opposed tire bead flanges on the drum, the lower flange being slidable on and removable from the lower end of the drum, a lower stop mounted on the drum adjacent but above the lower end thereof for movement from a position in engagement with said lower flange to a position clear of the same while remaining above the lower end of the drum, and means operable from the upper end of the drum to control such movement of the stop.

2. A tire mounting device comprising a cylindrical drum adapted to be disposed with its axis in a vertical position, a pair of opposed tire bead flanges on the drum, the lower flange being slidable on and removable from the lower end of the drum, a lower stop to engage said lower flange and prevent downward movement thereof, means mounting the stop on the drum adjacent its lower end for movement radially of the drum from a flange engaging position to a position clear of the flange, and means operable from the upper end of the drum to control such movement of the stop.

3. A tire mounting device comprising a cylindrical drum adapted to be disposed with its axis in a vertical position, a pair of opposed tire bead flanges on the drum, the lower flange being slidable on and removable from the lower end of the drum, a lower stop to engage said lower flange and prevent downward movement thereof, means mounting the stop on the drum adjacent but above its lower end for movement radially of the drum from a flange engaging position to a position clear of the flange, means acting on said stop tending to move the same to one of said positions, and means manually operable from the upper end of the drum to move said stop to the other one of said positions.

4. A tire mounting device comprising a cylindrical drum, a pair of tire-bead flange members separate from each other and freely slidable on the drum, stops on the drum adjacent its opposite ends to engage and limit such sliding movement of the members, one stop being fixed, means mounting the other stop for movement radially of the drum from a position projecting from the drum to a position substantially flush therewith, spring means acting on said other stop tending to move the same radially of the drum to one of said positions, and means manually operable from the end of the drum opposite said other stop to move said other stop radially of the drum to the other one of said positions.

5. A tire mounting device comprising a cylindrical drum, a pair of tire-bead flange members separate from each other and freely slidable on the drum, stops on the drum adjacent its opposite ends to engage and limit such sliding movement of the members, one stop being fixed, means mounting the other stop for movement radially of the drum from a position projecting from the drum to a position substantially flush therewith, spring means acting on said other stop tending to retract the same, and means manually operable from the opposite end of the drum to force said other stop radially out against the resistance of the spring means.

6. A tire mounting device comprising a cylindrical drum adapted to be vertically disposed, a pair of tire-bead flange members separate from each other and freely slidable on the drum, stops on the drum adjacent its opposite ends to engage and limit such sliding movement of the members, one stop being fixed, means mounting the other stop for movement radially of the drum from a position projecting from the drum to a position substantially flush therewith, spring means acting on said other stop tending to retract the same, and manually operable means to force said other stop radially out against the resistance of the spring means; said last named means comprising a bar extending lengthwise of the drum inside the same, means mounting the bar for longitudinal movement and maintaining the same in crossing relation to the inner end of said other stop, the side of the bar which faces said other stop being formed with a stop-engaging cam surface arranged to cause advance of such stop against the resistance of the spring means upon movement of the bar in one direction, while allowing the spring means to act to retract such stop upon movement of the bar in the opposite direction.

7. A device, as in claim 6, with means between the bar mounting means and the bar to limit the longitudinal movement of the bar in either direction.

8. A device, as in claim 7, in which said movement limiting means is arranged relative to the cam surface so as to allow of movement of the bar to a greater extent than the length of the cam surface and so that said cam surface is clear of such other stop at the opposite limits of movement of the bar.

References Cited in the file of this patent

UNITED STATES PATENTS

| | | |
|---|---|---|
| 1,113,925 | Batcheller | Oct. 13, 1914 |
| 1,236,301 | Hatcher | Aug. 7, 1917 |
| 1,508,858 | Sandborg et al. | Sept. 16, 1924 |
| 1,627,661 | Morrill | May 10, 1927 |
| 1,928,404 | Woock et al. | Sept. 26, 1933 |
| 2,424,487 | Monroe | July 22, 1947 |
| 2,683,898 | Glynn | July 20, 1954 |